(12) United States Patent
Hsu et al.

(10) Patent No.: US 6,475,249 B1
(45) Date of Patent: Nov. 5, 2002

(54) METHOD FOR MANUFACTURING MEMBRANE ELECTRODE ASSEMBLY OF FUEL CELL

(75) Inventors: Cheng Hsien Hsu, Chutung Hsinchu (TW); Chi Chao Wan, Chutung Hsinchu (TW); Yaw Chung Cheung, Chutung Hsinchu (TW); Yingjeng James Li, Chutung Hsinchu (TW)

(73) Assignee: Industrial Technology Research Institute, Chutung Hsinchu (TW)

( * ) Notice: Subject to any disclaimer, the term of this patent is extended or adjusted under 35 U.S.C. 154(b) by 75 days.

(21) Appl. No.: 09/588,178

(22) Filed: Jun. 7, 2000

(51) Int. Cl.$^7$ ................................................ H01M 4/04
(52) U.S. Cl. ............................ 29/623.1; 429/40; 429/44
(58) Field of Search ...................... 29/623.1; 429/40.45

(56) References Cited

U.S. PATENT DOCUMENTS 6,074,692 A * 6/2000 Hulett ......................... 427/115

FOREIGN PATENT DOCUMENTS

JP          405036418 A   *  2/1993   ............ H01M/4/88

\* cited by examiner

*Primary Examiner*—Patrick Ryan
*Assistant Examiner*—Mark Ruthkosky
(74) *Attorney, Agent, or Firm*—Troxell Law Office PLLC

(57) ABSTRACT

A method for manufacturing a membrane electrode assembly of a fuel cell by solvent pretreatment to the electrolyte membrane of the membrane electrode assembly is disclosed. A prepared electrolyte membrane is soaked in alcohol solvent for pre-expanding the electrolyte membrane at first, a catalyst layer is uniformly coated onto at least one side of the pre-expanded electrolyte membrane, and then the electrolyte membrane is dried for evenly shrinking the electrolyte membrane and the catalyst layer. Finally, the electrolyte membrane with catalyst layers is interposed between two gas diffusion electrodes, and the resulting sheet is pressed with heating to form the membrane electrode assembly.

13 Claims, 6 Drawing Sheets

METHOD FOR MANUFACTURING MEMBRANE ELECTRODE ASSEMBLY OF FUEL CELL

BACKGROUND OF THE INVENTION

1. Field of the Invention

The present invention generally relates to a method for manufacturing a fuel cell, and more particularly to a method for manufacturing a membrane electrode assembly of the fuel cell with solvent pretreatment to the electrolyte membrane of the membrane electrode assembly.

2. Description of the Prior Art

A fuel cell converts chemical energy into electrical energy and thermal energy by means of chemical reaction between hydrogen-containing fuel and oxygen. Benefits of the fuel cell include low pollution, high efficiency, high energy density and simple fuel recharge. Applications of the fuel cells include electrochemical engines, portable power supplies, standby power supply facilities, power generating systems, and so on.

The chemical reaction of a fuel cell requires the presence of an electrolyte, electrodes and catalysts. Based on the electrolyte, the fuel cell is classified as AFC, PAFC, MCFC, SOFC, and proton exchange membrane. During recent years, the proton exchange membrane type fuel cell is one of the most intensely-researched fuel cell. The proton exchange membrane may be classified as PEMFC and DMFC. The difference between PEMFC and DMFC is the fuel that they take. A PEMFC uses hydrogen or reformed gases containing rich hydrogen while a DMFC uses methanol solution.

A typical proton exchange membrane type fuel cell comprises a seven-layered structure, including a central electrolyte membrane for the transmission of protons, two catalyst layers on opposite sides of the electrolyte membrane in which the chemical reactions occur, two gas diffusion electrodes stacked on the catalyst layers comprising low porosity carbon paper or cloth through which reactants and reaction products diffuse in and out of the cell, and two flow field plates stacked on the gas diffusion electrodes. The flow field plates are made of carbon plates, metal plates or composite graphite fiber plates. Gas guide channels are defined on the gas diffusion electrode facing sides of the flow field plates. Reactants and reaction products are guided into/out of the cell through the flow field plates. The structure mentioned above forms a basic fuel cell unit. Conventionally, a fuel cell stack comprises a number of basic fuel cell units arranged to form a stack and is serially connected together. If desired, cooling plates and humidifying plates may be added to ensure the operation and performance of the fuel cell stack.

Examples of fuel cells and the manufacturing techniques thereof were disclosed in U.S, Pat. Nos. 5,252,410, 5,399,184, 5,523,177, 5,683,828, 5,723,173, 5,723,288, 5,869,201, and 6,010,606.

Porous material is used as the electrode of the fuel cell for the reaction gas coming in and the product gas going out, so called Gas Diffusion Electrode.

FIG. 1 shows a conventional basic fuel cell unit, comprising a central electrolyte membrane 10. One side of the electrolyte membrane 10 is coated with a cathode catalyst layer 21, and the other side of the electrolyte membrane 10 is coated with an anode catalyst layer 22. Two gas diffusion electrodes 31 and 32, which are usually made of carbon cloth or carbon paper, are formed on the outer side of the catalyst layers 21 and 22 respectively. The Conventional process for manufacturing the fuel cell unit is coating the catalyst slurry on the inner side of the gas diffusion electrodes 31 and 32 to form catalyst layers 21 and 22 respectively. Then, the electrolyte membrane 10 is interposed between the cathode gas diffusion electrode 31 and the anode gas diffusion electrode 32 coated with catalyst layer to form a basic fuel cell unit 1. It is found that the conventional method has a serious disadvantage that the catalyst slurry is easily permeating into the carbon cloth or carbon paper of the gas diffusion electrode, and the thickness of the catalyst layer coated is not easy to be controlled.

In another manufacturing method in prior art, the catalyst slurry is coated on both sides of the electrolyte membrane 10, as shown in FIG. 2. The structure fabricated by this approach is so called Membrane Electrode Assembly (MEA). In this process, the surfaces of both sides of the electrolyte membrane 10 are first coated with a cathode catalyst layer 21 and an anode catalyst layer 22 respectively. Then, the electrolyte membrane 10 is interposed between the gas diffusion electrodes 31 and 32 to form a basic fuel cell unit 1.

FIG. 3 is a left side elevational view showing the electrolyte membrane 10 and the cathode catalyst layer 21 shown in FIG. 2. FIG. 4 is a right side elevational view showing the electrolyte membrane 10 and the anode catalyst layer 22 shown in FIG. 2.

FIG. 5 is a perspective view showing a fuel cell stack comprising a basic fuel cell unit 1, an anode gas distribution plate 4 for transporting hydrogen, a cathode gas distribution plate 6 for transporting oxygen, and a cooling plate/humidifying plate 5. The anode gas distribution plate 4 and cathode gas distribution plate 6 may be combined to be a bi-polar plate 7.

Coating catalyst layer on the electrolyte membrane directly makes the catalyst slurry and the electrolyte membrane contact better, thereby decreasing reaction resistance and increasing activity. It is easier to control the thickness and quantity of the catalyst layer, thereby decreasing the quantity used and cost of the catalyst slurry.

However, the polymeric material of the electrolyte membrane available in the market, such as Nafion produced by DuPont or the products produced by Dow, Asahi Chemical, or Asahi Glass, has feature of good water adsorption. It is found that the polymeric material of the electrolyte membrane will absorb the solvent of the catalyst slurry when coating the slurry on the electrolyte membrane, thereby causing the electrolyte membrane expanding and deforming. With this character, it becomes a problem to coat the catalyst slurry on both sides of the electrolyte membrane evenly for making MEA.

For overcoming the problem of the electrolyte membrane deformation discussed above, a plurality of new manufacturing processes are developed. One of the new processes is coating the catalyst slurry on a transfer paper, then transferring the catalyst layer to the electrolyte membrane by hot pressing. FIG. 6 shows a conventional manufacturing process for manufacturing a fuel cell unit. The method comprises the following steps: preparing an electrolyte membrane 100, changing the property of the electrolyte membrane 101, coating catalyst layer on one side of the electrolyte membrane 102, pre-drying 103, coating catalyst layer on the other side of the electrolyte membrane 104, drying 105, changing the property of the electrolyte membrane again 106, finishing MEA 107, interposing the MEA between two gas diffusion electrodes and hot pressing 108, and finished the basic fuel cell unit 109.

In the prior art manufacturing method mentioned above, the property of the electrolyte membrane needs to be changed from H-form to Na-form by ion exchanging in step 101. Then, the Na-form membrane must be changed back to H-form in step 106 for purpose of proton transmission. In addition, the processes of this prior art must include coating a first catalyst layer on one side of the electrolyte membrane at first, pre-drying the electrolyte membrane coated with catalyst layer, coating a second catalyst layer on the other side of the electrolyte membrane, and drying the electrolyte membrane again. It is noted that the processes are so complex.

SUMMARY OF THE INVENTION

Accordingly, the object of the present invention is to provide a method for manufacturing membrane electrode assembly of a fuel cell for overcoming the problem of deforming when coating the catalyst slurry on the electrolyte membrane.

Another object of the present invention is to provide a simple method for manufacturing membrane electrode assembly of a fuel cell. The property of the electrolyte membrane doesn't need to be changed when coating the catalyst slurry, and both sides of the membrane can be coated at the same time, making the manufacturing process much simpler.

Another object of the present invention is to provide a membrane electrolyte assembly with catalyst layers having fine structure for preventing from chapping or unevenness on the surface thereof. And the catalyst layer has nice contact with the electrolyte membrane thereby increasing reaction activity therebetween.

Another object of the present invention is to provide a method for manufacturing membrane electrode assembly of a fuel cell which can effectively control the thickness of the catalyst layer and also the quantity used of the catalyst slurry.

One more object of the present invention is to provide a method for manufacturing membrane electrode assembly of a fuel cell having better electric performance. Through the method of the present invention, the construction of the catalyst layer is improved, and also the contact between the catalyst layer and the electrolyte membrane is improved, thereby increasing the electric performance of the fuel cell.

To achieve the above objects, in accordance with the present invention, the electrolyte membrane is pre-expanded with solvent treatment and then at least one side of the electrolyte membrane is coated with catalyst slurry. The purpose of pre-expanding treatment is to prevent the electrolyte membrane from deforming when coating catalyst slurry on the membrane. Thereafter, the electrolyte membrane coated with catalyst layer is dried to evenly shrink the electrolyte membrane and the catalyst layer. By means of the processes of the present invention, the surface of the catalyst layer is even and not easily chapping, and the thickness and quantity of the catalyst layer is much easier to be controlled.

Preferably, before pre-expanding the electrolyte membrane, the organic matters on the surface of the membrane is removed by steps of soaking the electrolyte membrane in pure water, soaking the electrolyte membrane in $H_2O_2$ solution, while heating the electrolyte membrane at a temperature of 60~70° C. for one hour, and cleaning the electrolyte membrane for removing organic matters from the electrolyte membrane.

Preferably, before pre-expanding the electrolyte membrane, the inorganic matter on the surface of the membrane is removed by steps of rinsing the electrolyte membrane with pure water 3~4 times, soaking the electrolyte membrane in $H_2SO_4$ solution, while heating the electrolyte membrane at a temperature of 70~80° C. for one hour, rinsing the electrolyte membrane for removing inorganic matters from the electrolyte membrane, rinsing the electrolyte membrane with pure water 3~4 times again, and drying the electrolyte membrane at room temperature.

Preferably, the electrolyte membrane is soaked in alcohol such as Ethylene Glycol for at least 10 minutes.

Preferably, the catalyst layer is selected from the group consisting of Pt/C powder (20% Pt), Nafion solution (5 wt %), and Ethylene Glycol. The formula ratio of the Pt/C powder, Nafion solution, and Ethylene Glycol is Pt/C:Dry Nafion=3:1 by weight, and Ethylene Glycol:Nafion solution=1:1 by volume.

Preferably, the membrane electrolyte assembly fabricated by the present invention is further incorporated with a conducting plate and a graphite flow field plate onto the outer side of the membrane electrode assembly to form a fuel cell unit.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENTS

The present invention provides a method for manufacturing the membrane electrode assembly (MEA) of PEMFC and DMFC. The membrane electrode assembly may be further constructed to form a basic fuel cell unit. The method for manufacturing MEA of a fuel cell in accordance with the present invention includes a step of pre-expanding the electrolyte membrane at first, then coating the catalyst slurry onto both sides of the membrane evenly by printing or spraying technique to form the membrane electrode assembly.

Figure 2:
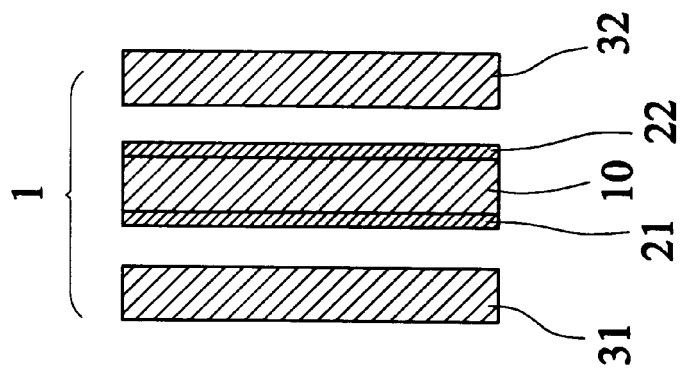
FIG. 2 is a perspective view showing another kind of conventional basic fuel cell unit.
Figure 1:
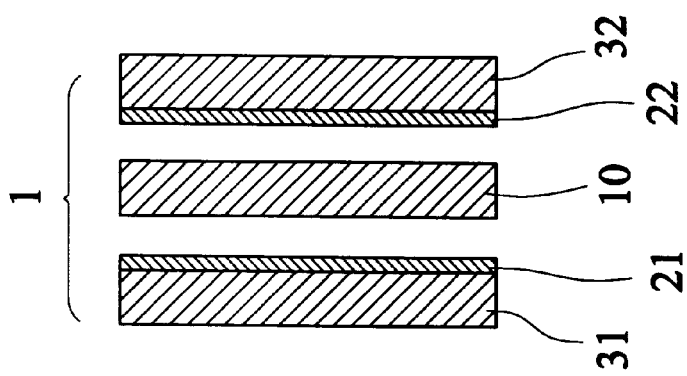
FIG. 1 is a perspective view showing a conventional basic fuel cell unit.
Figure 4:
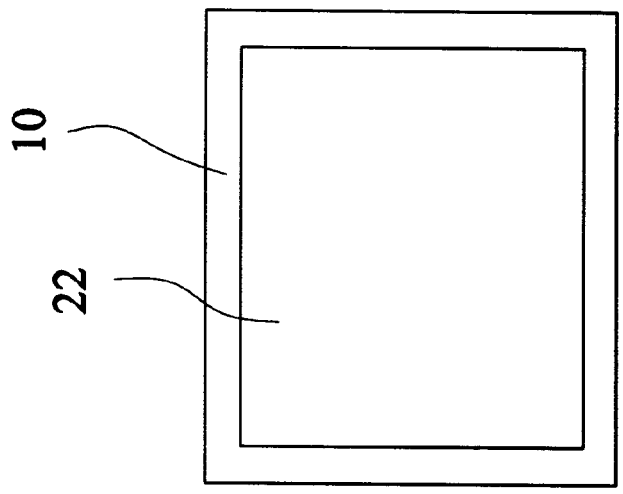
FIG. 4 is a right side elevational view showing the electrolyte membrane and the anode catalyst layer shown in FIG. 2.
Figure 3:
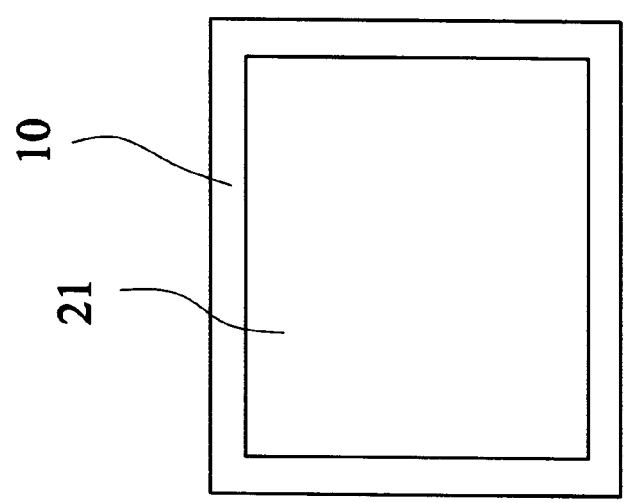
FIG. 3 is a left side elevational view showing the electrolyte membrane and the cathode catalyst layer shown in FIG. 2.
Figure 5:
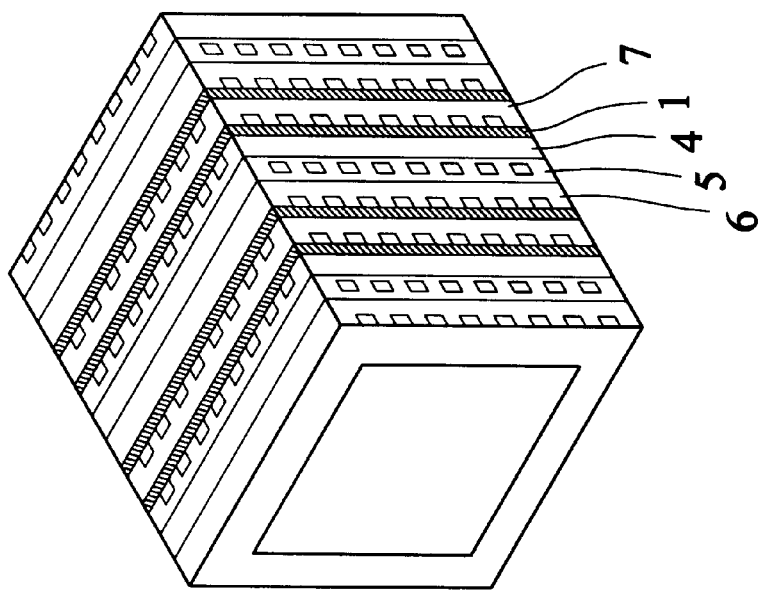
FIG. 5 is a perspective view showing a conventional fuel cell stock.
Figure 6:
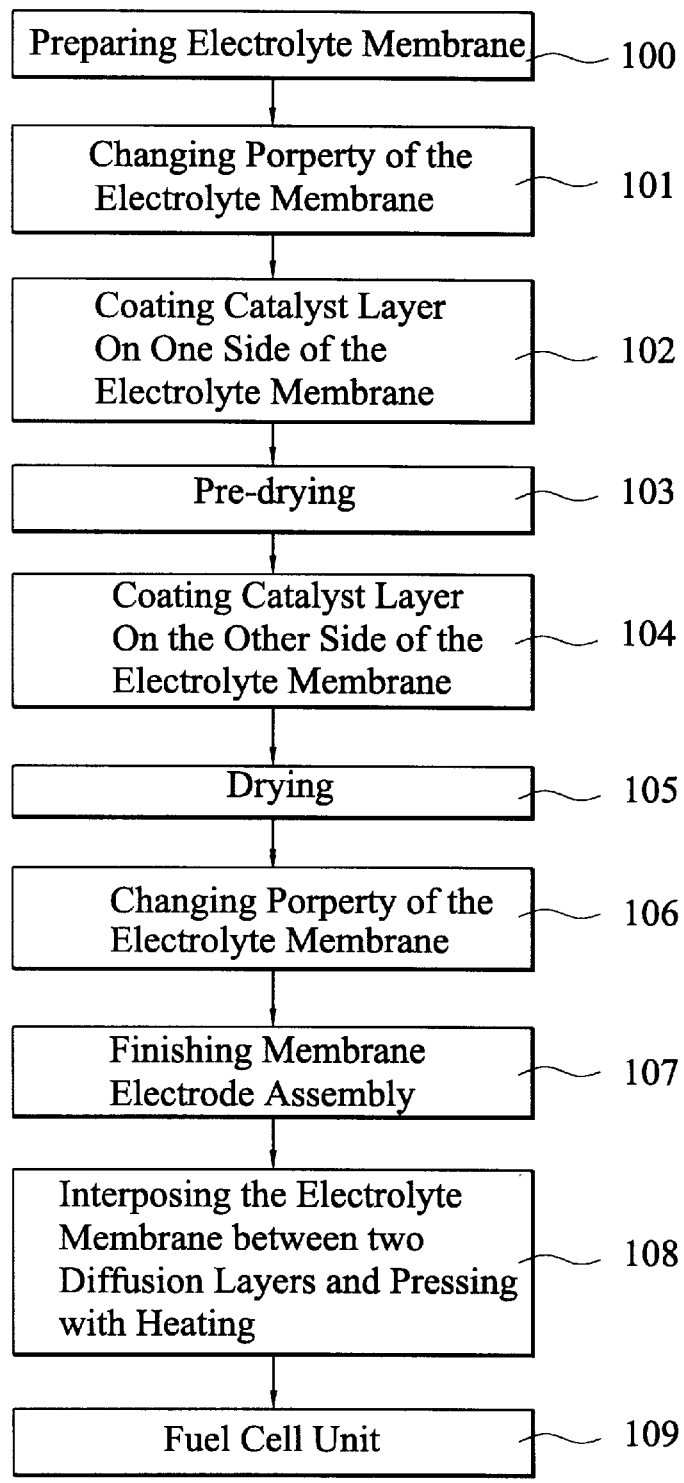
FIG. 6 a flow chart of manufacturing a fuel cell unit in accordance with a conventional manufacturing process.
Figure 7:
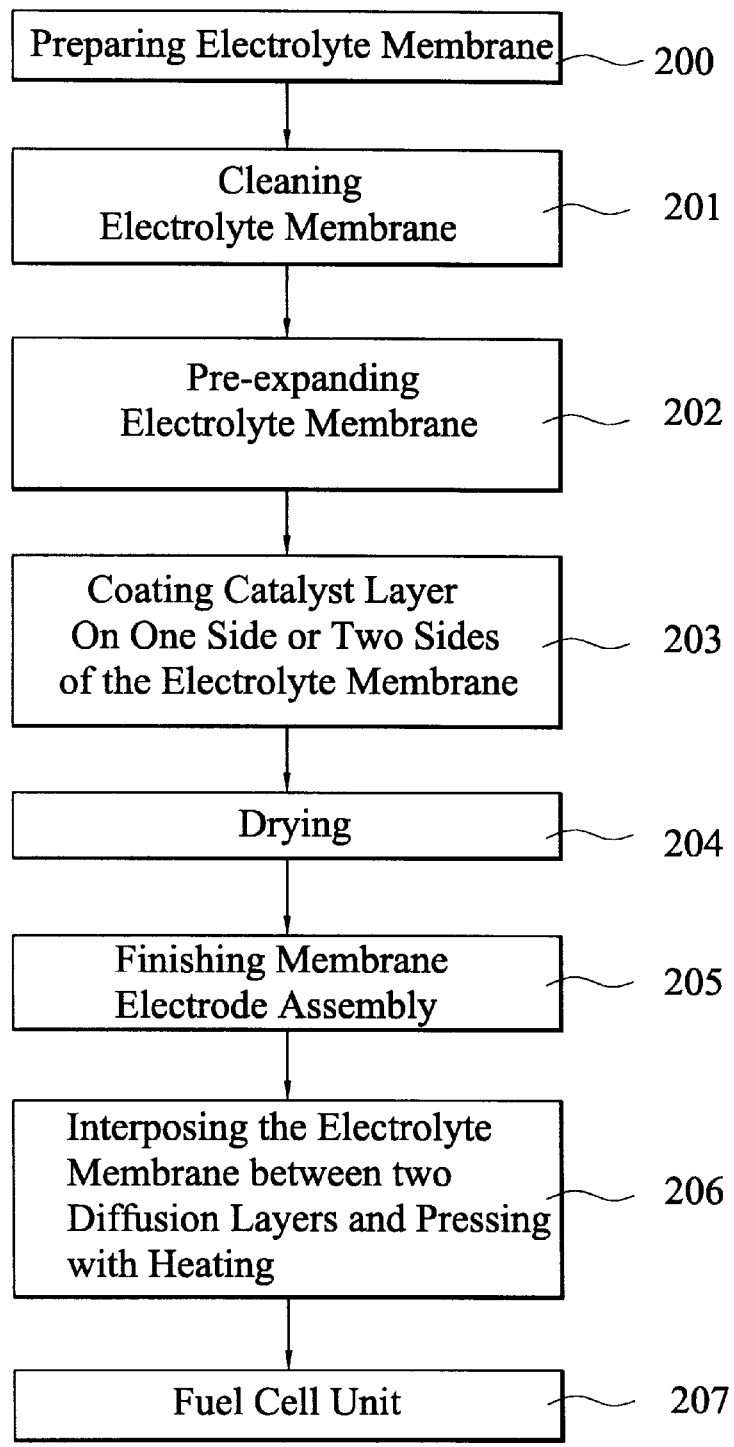
FIG. 7 a flow chart of manufacturing a fuel cell unit in accordance with a preferred embodiment of the present invention.

FIG. 7 shows the manufacturing processes in accordance with the present invention. At the beginning step 200, preparing an electrolyte membrane made of polymeric material, such as Nafion 117 produced by DuPont, is cut into a suitable size, such as 6 cm×6 cm, and soaking the membrane into pure water. The cutting direction must be the same as the manufacture direction of the Nafion 117.

Then, the electrolyte membrane is cleaned to remove organic matters and inorganic matters from the surface of the membrane. The cleaning step includes soaking the membrane into $H_2O_2$ solution (3 wt %), heating at a temperature of 60~70° C. for one hour, and rinsing the membrane to remove organic matters from the surface of the membrane. Thereafter, rinse the electrolyte membrane with pure water 3~4 times, soak the membrane into 0.5M $H_2SO_4$ solution, heat at a temperature of 70~80° C. for one hour, and rinse to remove inorganic matters from the surface of the membrane. Next, rinse the membrane with pure water 3~4 times, step 201, and place the membrane at room temperature for drying.

In step 202, the electrolyte membrane is expanded with solvent treatment. This step includes soaking the electrolyte membrane into the solvent for at least 10 minutes to adequately expand the electrolyte membrane. In a preferred embodiment of the present invention, the solvent includes alcohol, preferably Ethylene Glycol. At this time, the electrolyte membrane will expand from the size of 6 cm×6 cm to 6.6 cm×7.1 cm.

After the pre-expanding step described above, catalyst slurry is prepared and coated on one side or both sides of the expanded electrolyte membrane evenly in step 203. The catalyst slurry is selected from the group consisting of Pt/C powder (20% Pt) produced by E-TeK, Nafion solution (5 wt %) produced by Aldrich, and Ethylene Glycol. The method of preparing the catalyst slurry is grinding the Pt/C powder, and then mixing with Ethylene Glycol to form a mixture, and then gently dripping Nafion solution into the mixture during stirring, and agitates the mixture by ultrasonic waves. The formula ratio of the Pt/C powder, Nafion solution, and Ethylene Glycol is Pt/C:Dry Nafion 3:1 by weight, and Ethylene Glycol:Nafion solution=1:1 by volume.

In accordance with the preferred embodiment of the present invention, the catalyst slurry is sprayed onto one side or both sides of the electrolyte membrane directly. Because the membrane has been expanded, spraying the catalyst slurry onto the membrane directly will not cause shape changing. The coating step 203 further includes steps of wiping the residual Ethylene Glycol on the surface of the expanded electrolyte membrane, adhering a mask with a 5.5 cm×5.5 cm window on both sides of the membrane, placing the membrane on a shelf, and spraying the catalyst slurry onto both sides of the membrane evenly. So, a catalyst layer with an effective area of 5.5 cm×5.5 cm is formed on both sides of the membrane.

In step 204, heat the electrolyte membrane until the surface slightly drying. Hang the membrane on the shelf and place the shelf into a vacuum oven, drying at a temperature less than 80° C. for at least 4 hours. After drying, the catalyst layer will shrink to 5 cm×5 cm.

After completing all the steps mentioned above, the MEA is finished (step 205). Thereafter, the MEA may be interposed between two gas diffusion electrodes, and be pressed in 5000 lb/135° C. for 90 seconds (step 206). Finally, assemble the MEA with a conducting plate and a graphite flow field plate on the outer side, thereby finishing a basic fuel cell unit (step 207).

Figure 8:
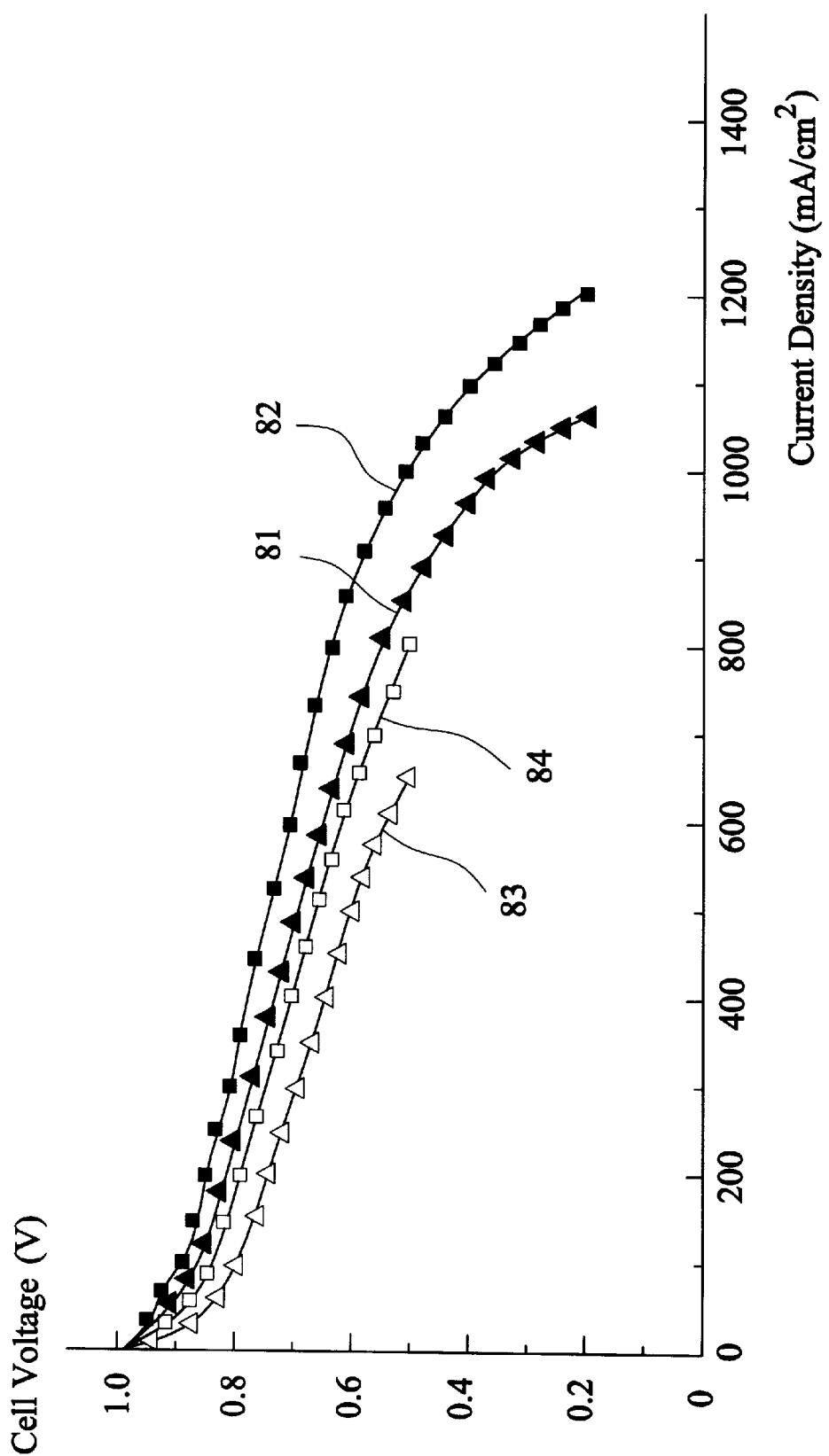
FIG. 8 is a plot of cell voltage versus current density, showing electric performances of the MEA fabricated by the present invention and that fabricated by the prior art.

FIG. 8 shows the electric performance of the MEA fabricated by the technique of the present invention comparing with the E-Tek Electrodes, widely used commercial products. The curves 81 to 84 shown in FIG. 8 are obtained under conditions that the temperature of fuel cell is 80° C.; the temperature of anode humidifier is 95° C., the temperature of cathode humidifier is 85° C., and the anode/cathode pressures are 3 atm.

The horizontal coordinate represents the current density, and the vertical coordinate represents the cell voltage. The Curve 81 shows the performance when the cathode of E-Tek Electrodes using oxygen gas, the curve 82 shows the performance when the cathode of the present invention using oxygen gas, the curve. 83 shows the performance when the cathode of E-Tek Electrodes using air, and the curve 84 shows the performance when the cathode of the present invention using air. It is found from the curves that the performance of the present invention is better than E-Tek Electrodes no matter when the cathode using either oxygen gas or air. It means that the present invention effectively improves the efficacy of the fuel cell.

With pre-expanding the electrolyte membrane with solvent treatment, the advantages of the present invention are:

1. The structure of the catalyst layer is fine and, delicate, effectively preventing from the surface of the catalyst layer chapping or unevenness;
2. The catalyst layer has nice contact with the electrolyte membrane thereby increasing the reaction activity therebetween;
3. With fine structure of the catalyst layer, the thickness of the catalyst layer may be effectively controlled, thereby decreasing the using quantity of the catalyst.
4. The MEA is fabricated easily with lower cost.

We claim:

1. A method of manufacturing a membrane electrode assembly of a fuel cell having two gas diffusion electrodes and an electrolyte membrane interposed between the gas diffusion electrodes, comprising steps of:
    a) cutting an electrolyte membrane into a predetermined size having first height and first width dimensions;
    b) preparing the cut electrolyte membrane;
    c) soaking the cut electrolyte membrane in a solvent thereby expanding the electrolyte membrane at a predetermined expanding rate;
    d) preparing a catalyst slurry and coating the catalyst slurry onto at least one side of the expanded electrolyte membrane, thereby forming a catalyst layer on the expanded electrolyte membrane, the catalyst layer having predetermined second height and second width dimensions less than the first height and first width dimensions;
    e) drying the electrolyte membrane coated with catalyst layer to evenly shrink the first and second height and width dimensions of the electrolyte membrane and the catalyst layer; and
    f) interposing the electrolyte membrane between two gas diffusion electrodes to form the membrane electrode assembly.

2. The method as claimed in claim 1, wherein the step of preparing the cut electrolyte membrane comprises the following steps:
    a) soaking the cut electrolyte membrane in pure water;
    b) soaking the cut electrolyte membrane in $H_2O_2$ solution;
    c) heating the cut electrolyte membrane at a temperature of between 60~70° C.; and
    d) cleaning the cut electrolyte membrane for removing organic matter therefrom.

3. The method as claimed in claim 2, further comprising the following steps after cleaning the cut electrolyte membrane:

a) rinsing the electrolyte membrane in pure water between 3~4 times;
b) soaking the electrolyte membrane in $H_2SO_4$ solution;
c) heating the electrolyte membrane at a temperature of between 70~80° C.;
d) rinsing the electrolyte membrane for removing inorganic matter therefrom;
e) rinsing the electrolyte membrane with pure water between 3~4 times; and
f) drying the electrolyte membrane at room temperature.

4. The method as claimed in claim 1, wherein the electrolyte membrane is a proton exchange membrane.

5. The method as claimed in claim 1, wherein the cut electrolyte membrane is soaked in the solvent for at least 10 minutes.

6. The method as claimed in claim 1, wherein the solvent is alcohol.

7. The method as claimed in claim 6 wherein the alcohol is Ethylene Glycol.

8. The method as claimed in claim 1, wherein the predetermined expanding rate of the electrolyte membrane is 5~15%.

9. The method as claimed in claim 1, wherein the step of preparing the catalyst slurry comprises the following steps:
    a) grinding a Pt/C powder, and then mixing the ground powder with Ethylene Glycol to form a mixture;
    b) gently dripping-perfluorsulfonic acid solution into the mixture while stirring; and
    c) agitating the mixture by ultrasonic waves.

10. The method as claimed in claim 1, wherein the step of drying the electrolyte membrane comprises the following steps:
    a) heating the electrolyte membrane until a surface of the electrolyte membrane is slightly drying;
    b) hanging the electrolyte membrane in a vacuum oven; and
    c) heating the electrolyte membrane at a temperature of not more than 80° C. for at least 4 hours.

11. The method as claimed in claim 1, wherein the gas diffusion electrode is made of carbon cloth.

12. The method as claimed in claim 1, wherein the step of interposing the electrolyte membrane between two gas diffusion electrodes comprises the additional step of:
    pressing the gas diffusion electrodes and the electrolyte membrane at a pressing force of 5000 lb and at a temperature of 135° C. for 90 seconds.

13. The method as claimed in claim 1, comprising the further step of assembling a conducting plate and a graphite flow field plate onto an outer side of the membrane electrode assembly to form a fuel cell unit, after interposing the electrolyte membrane between the gas diffusion electrodes.

* * * * *